(12) United States Patent
Oshiumi et al.

(10) Patent No.: US 8,392,907 B2
(45) Date of Patent: Mar. 5, 2013

(54) COMMUNICATION TERMINAL

(75) Inventors: Nobuhiro Oshiumi, Fukuoka (JP); Hidekazu Makino, Fukuoka (JP); Yuji Ito, Fukuoka (JP); Tomokazu Katsuro, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 332 days.

(21) Appl. No.: 12/820,706

(22) Filed: Jun. 22, 2010

(65) Prior Publication Data
US 2010/0262960 A1 Oct. 14, 2010

Related U.S. Application Data

(63) Continuation of application No. PCT/JP2007/075005, filed on Dec. 26, 2007.

(51) Int. Cl.
*G06F 9/44* (2006.01)
(52) U.S. Cl. ........ 717/171; 717/172; 717/173; 717/177; 717/178
(58) Field of Classification Search .................. 717/171, 717/173, 176, 178, 172, 177
See application file for complete search history.

(56) References Cited

U.S. PATENT DOCUMENTS

| | | | | |
|---|---|---|---|---|
| 5,905,866 A * | 5/1999 | Nakabayashi et al. | ......... | 709/223 |
| 6,138,249 A * | 10/2000 | Nolet | ............... | 714/25 |
| 6,990,660 B2 * | 1/2006 | Moshir et al. | ................. | 717/171 |
| 7,302,688 B2 | 11/2007 | Shitahaku | | |
| 7,568,018 B1 * | 7/2009 | Hove et al. | .................... | 709/221 |
| 7,734,574 B2 * | 6/2010 | Dang et al. | ............................. | 1/1 |
| 7,818,739 B2 * | 10/2010 | Cox et al. | ....................... | 717/171 |
| 8,005,725 B2 * | 8/2011 | Takahashi et al. | ........... | 705/26.8 |
| 8,151,249 B2 * | 4/2012 | Ohta et al. | .................... | 717/127 |
| 8,176,483 B2 * | 5/2012 | Hoefler et al. | ................. | 717/173 |
| 2003/0233594 A1 * | 12/2003 | Earl | ................................. | 714/4 |
| 2004/0030982 A1 * | 2/2004 | Aldridge et al. | .............. | 714/776 |
| 2004/0237097 A1 * | 11/2004 | Covell et al. | .................... | 725/16 |
| 2005/0223352 A1 | 10/2005 | Nishida | | |

FOREIGN PATENT DOCUMENTS

| | | |
|---|---|---|
| JP | 03244030 | 10/1991 |
| JP | 2000222296 | 8/2000 |
| JP | 2003078637 | 3/2003 |
| JP | 2003177926 | 6/2003 |
| JP | 2004341718 | 12/2004 |
| JP | 2005196269 | 7/2005 |
| JP | 2005284904 | 10/2005 |
| JP | 2006155225 | 6/2006 |
| JP | 2006340196 | 12/2006 |
| JP | 2007183782 | 7/2007 |

OTHER PUBLICATIONS

International Preliminary Report on Patentability and Written Opinion issued in PCT/JP2007/075005 dated Jul. 29, 2010.
Japanese Notification of Reasons for Refusal dated Nov. 9, 2010, issued in application No. 2009-546916.
International Search Report dated Feb. 5, 2008 in corresponding International application No. PCT/JP2007/075005.

* cited by examiner

*Primary Examiner* — Phillip H Nguyen
(74) *Attorney, Agent, or Firm* — Smith, Gambrell & Russell, LLP

(57) ABSTRACT

A communication terminal includes: an update section that obtains software via a communication network from a predetermined provider so as to update the software; and a failure monitor section that monitors whether there is a failure to interfere with an update of the software by the update section. The communication terminal further includes an update record section that records, if there is the failure and the update becomes an incomplete update on an occasion of the update by the update section, the presence of the incomplete update; and an update prompting section that prompts, if a monitor result by the failure monitor section changes from that there is a failure to that there is no failure, performing by the update section the update whose presence is recorded by the update record section.

5 Claims, 15 Drawing Sheets

FIG. 3

| UPDATE TIME (310) | OEM APPLICATION UPDATE START TIME | YYYY/MM/DD hh:mm | 311 |
| --- | --- | --- | --- |
| | OS UPDATE START TIME | YYYY/MM/DD hh:mm | 312 |
| STATE (320) | IN UPDATING OS | Yes/No | 321 |
| | BLIND SPOT | Yes/No | 322 |
| | RESTRICTED | Yes/No | 323 |
| | BATTERY REMAINING AMOUNT | OK/NG | 324 |

300

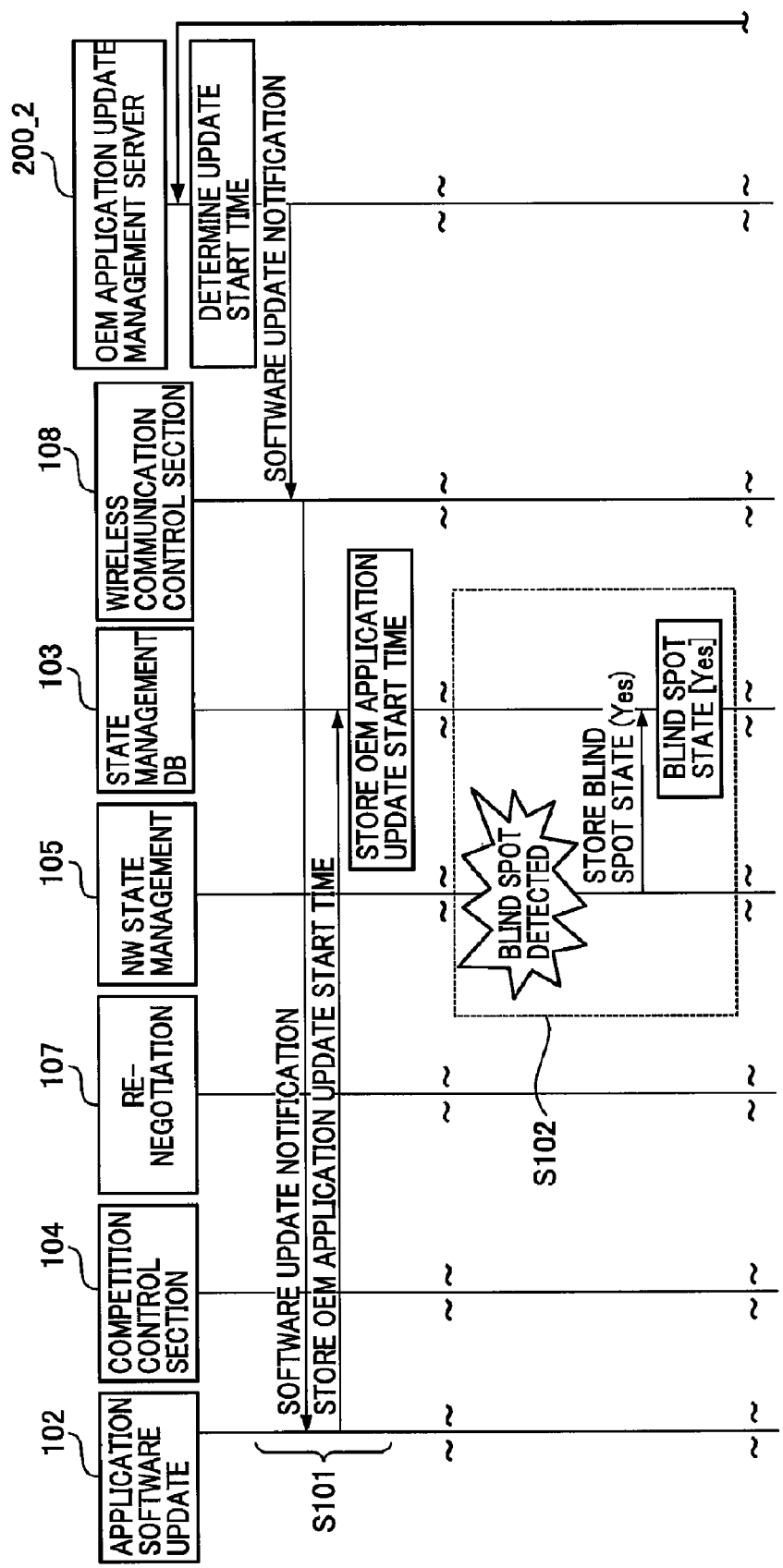

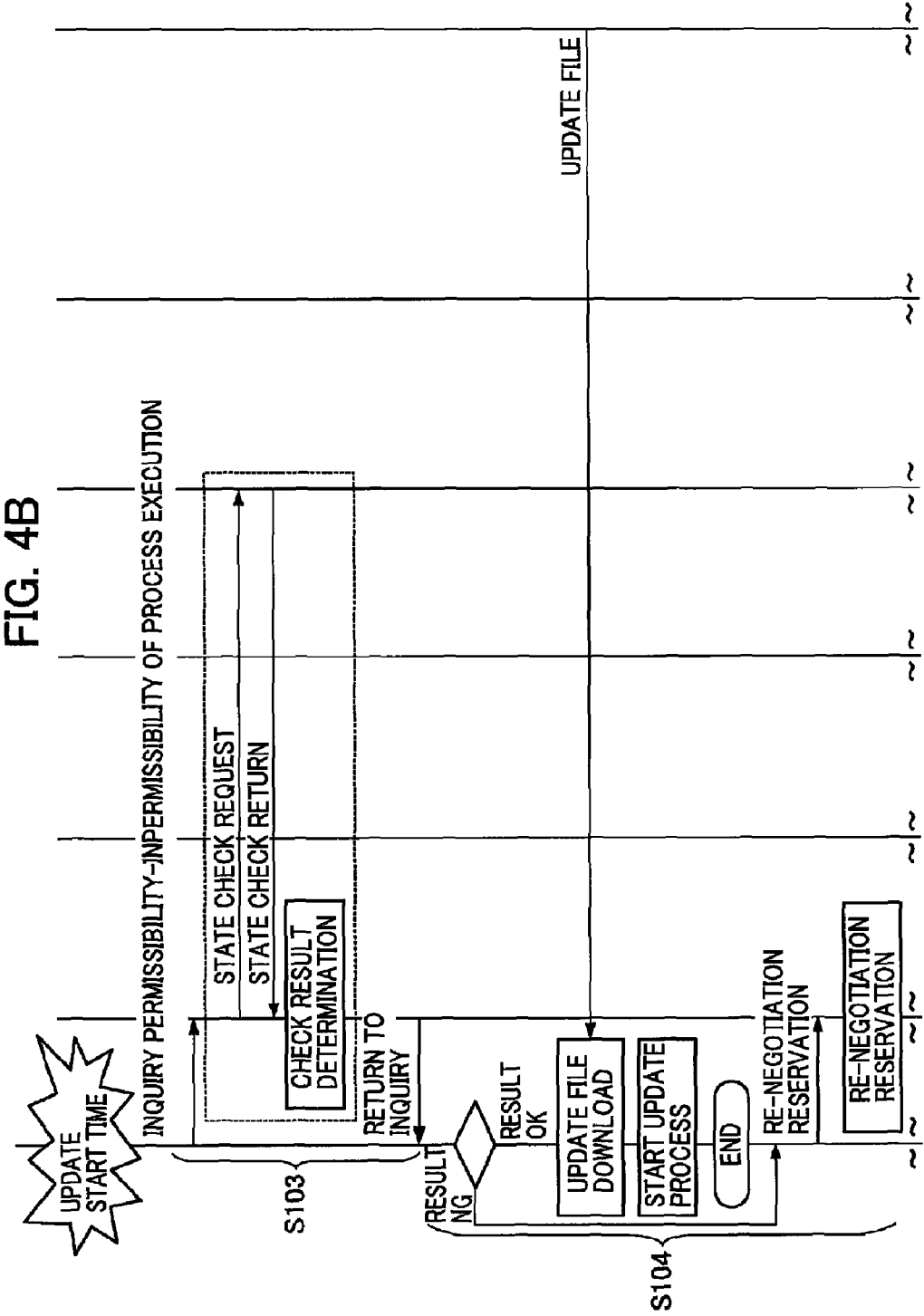

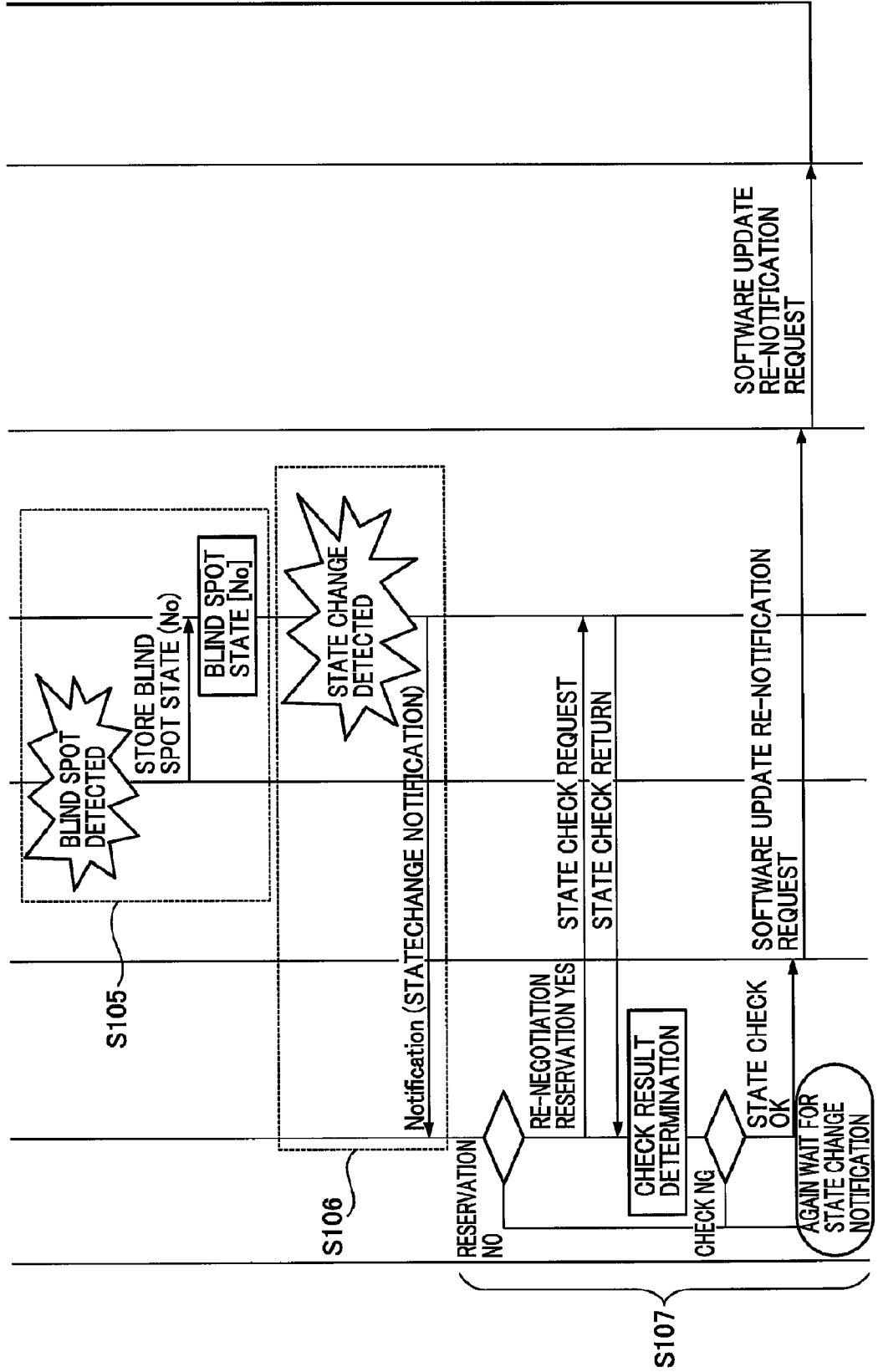

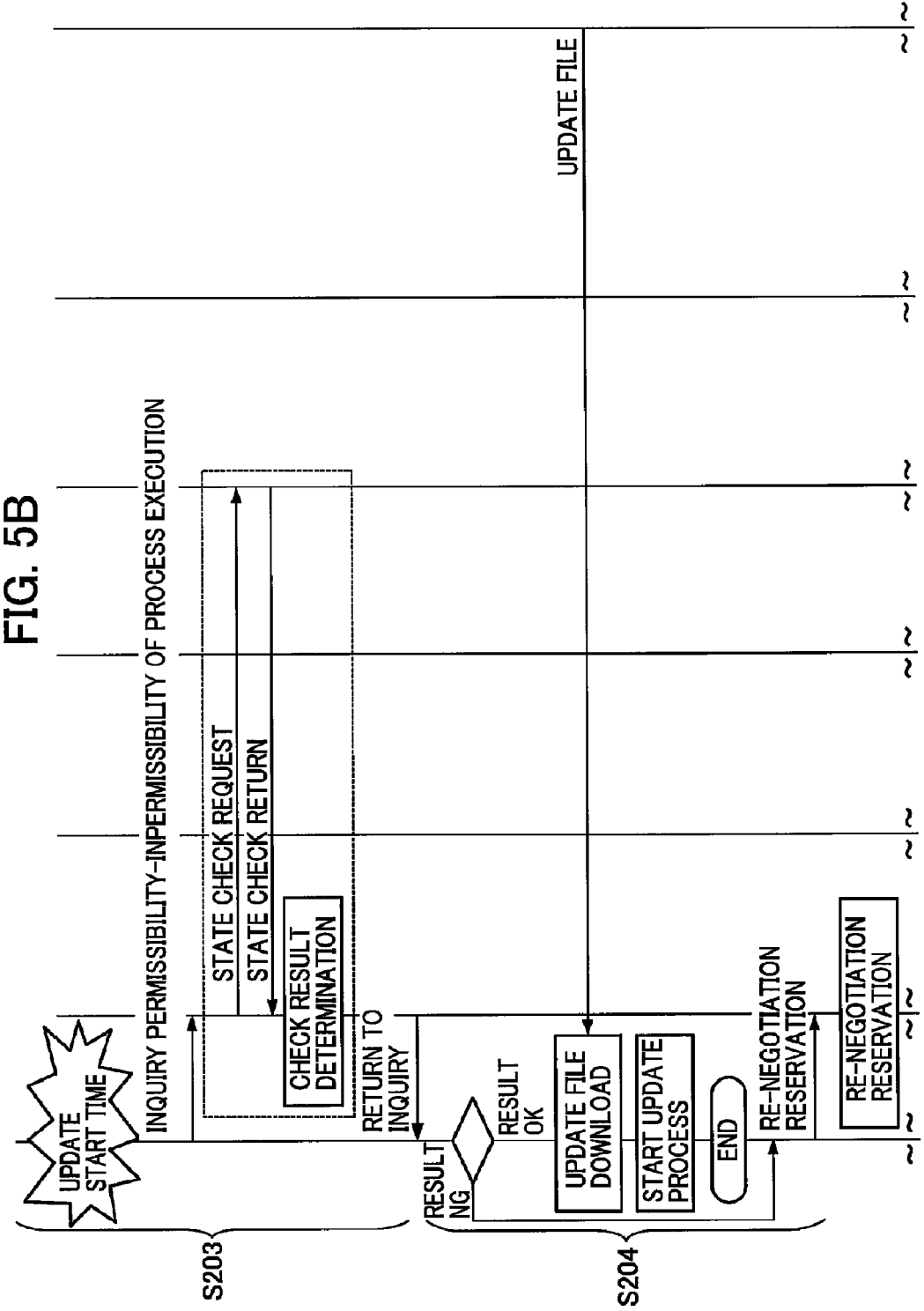

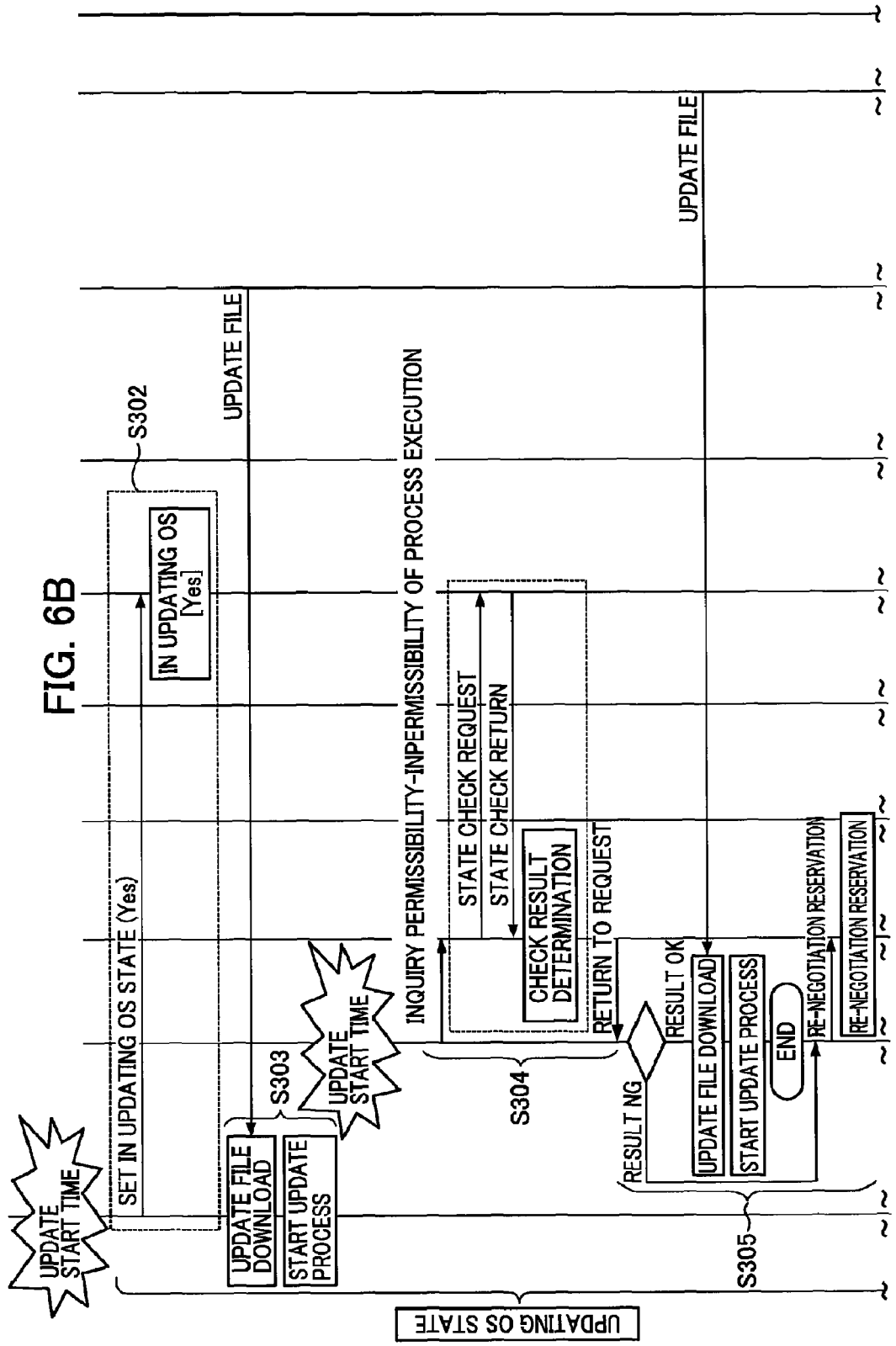

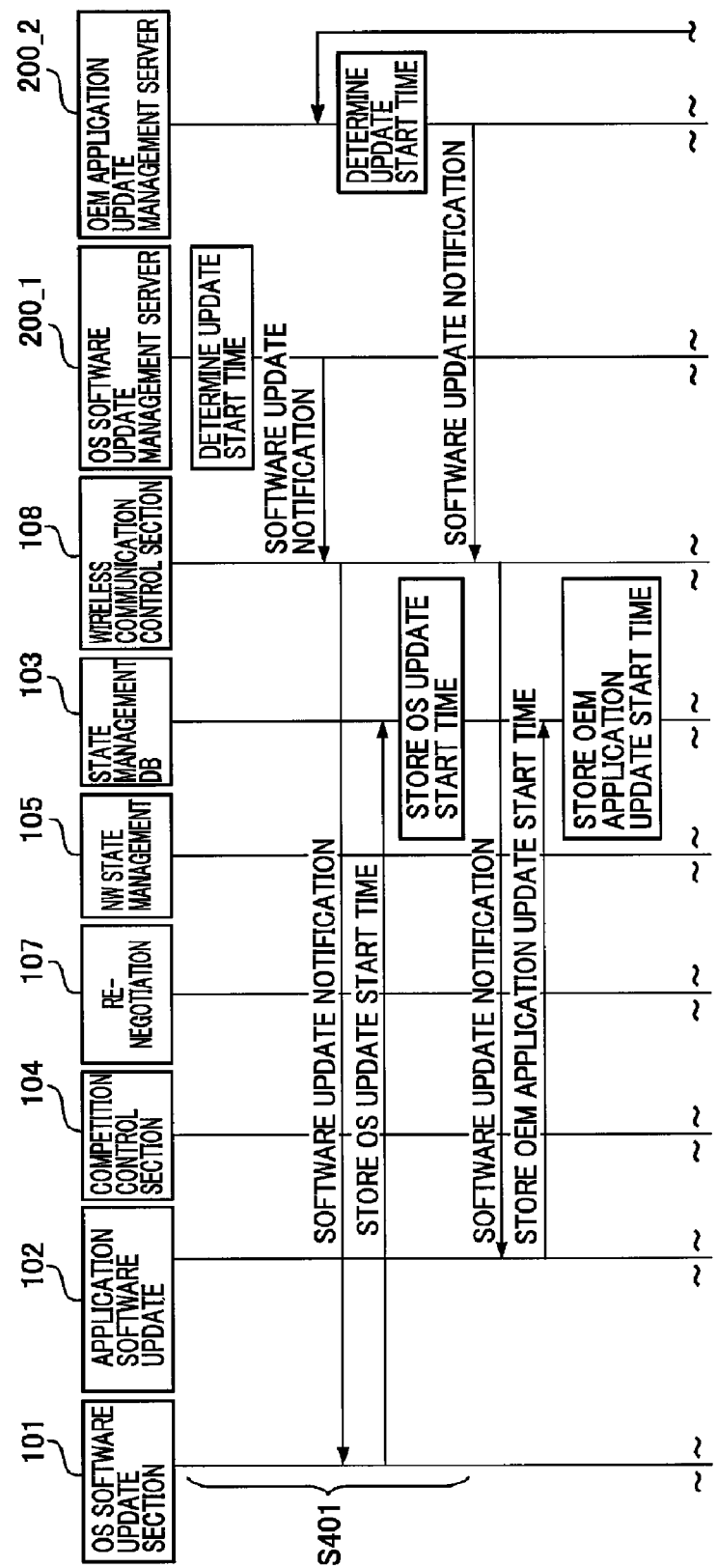

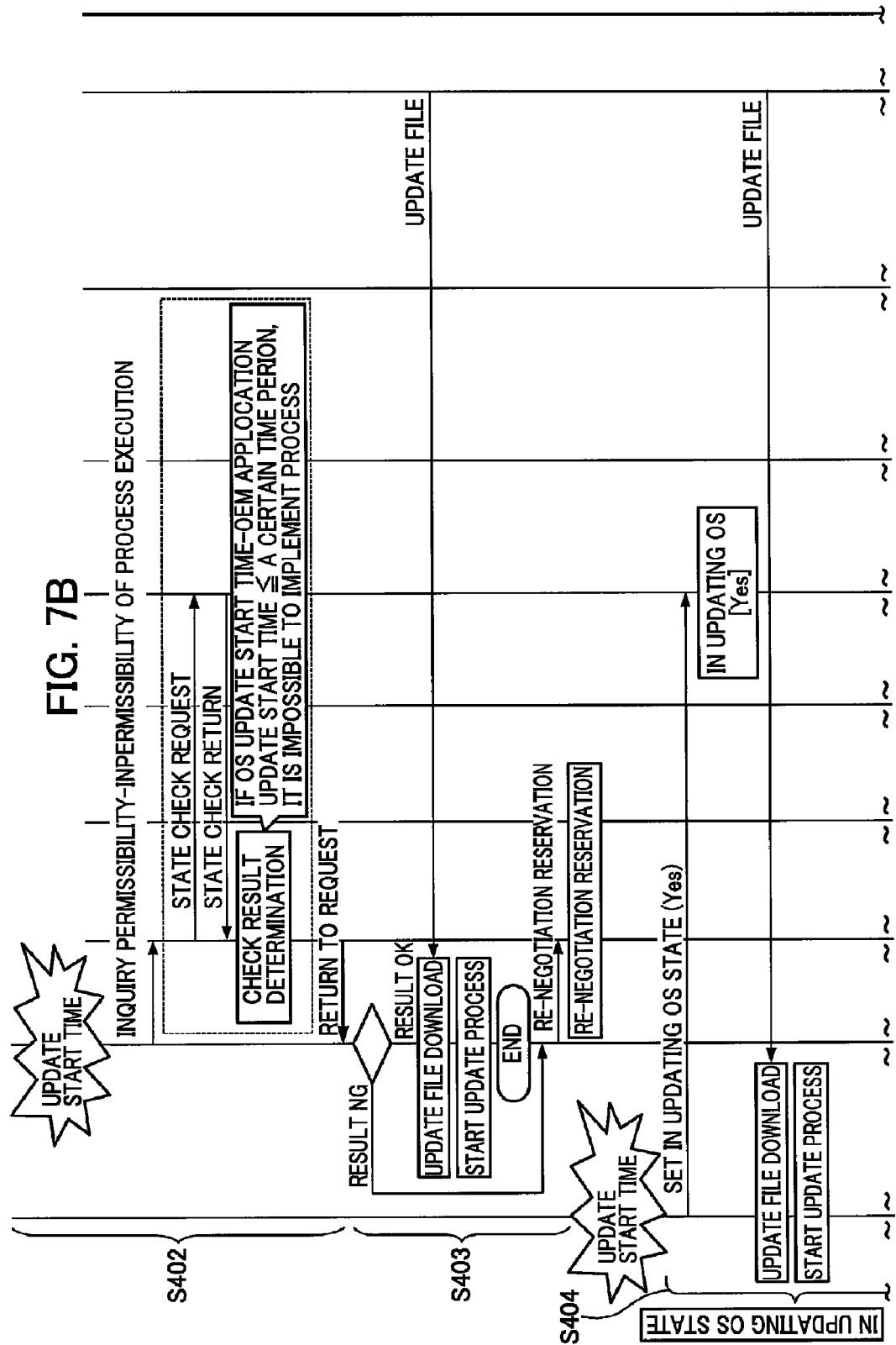

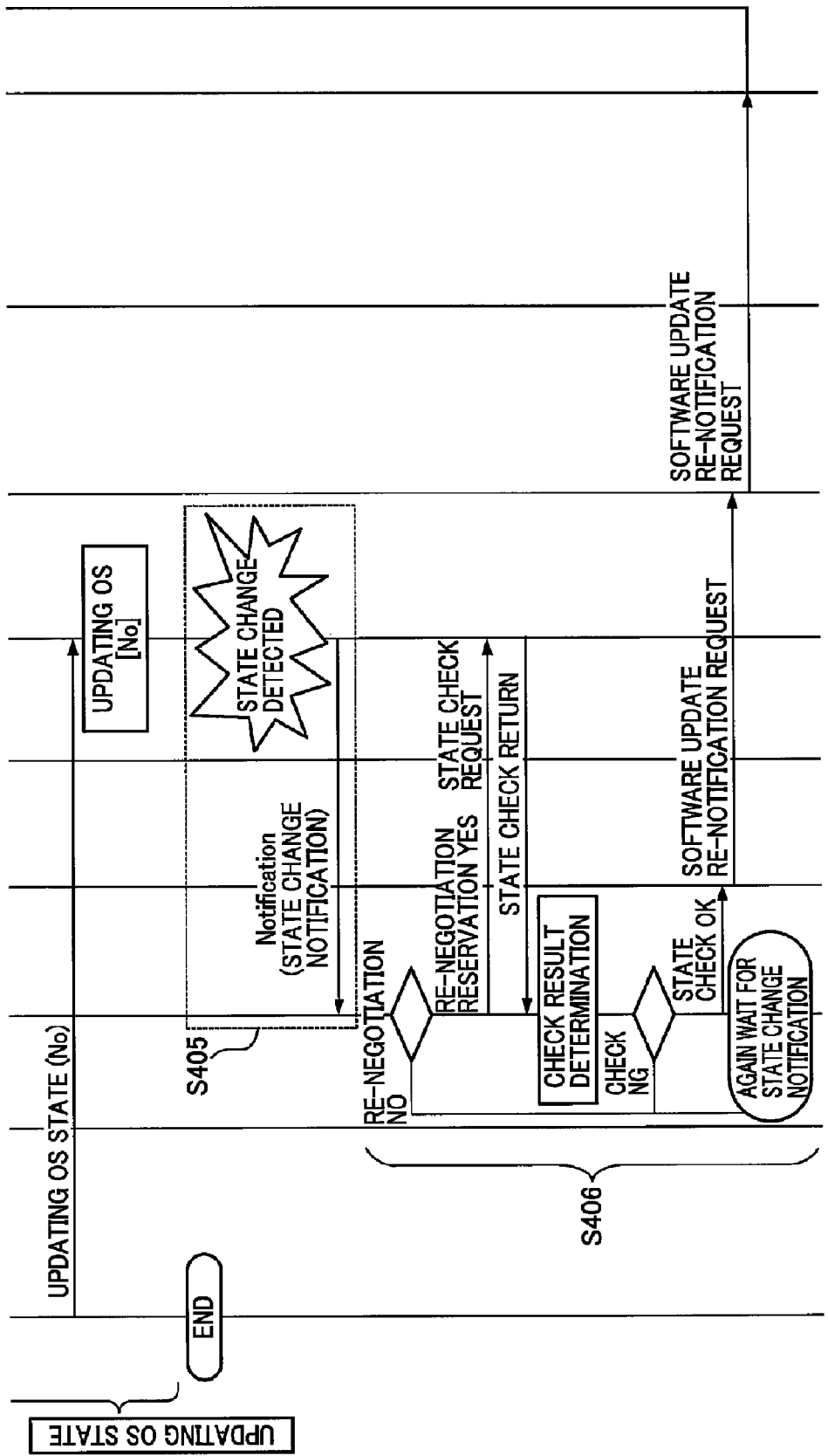

COMMUNICATION TERMINAL

CROSS-REFERENCE TO RELATED APPLICATION

This is a continuation application of PCT/JP2007/075005, filed on Dec. 26, 2007.

FIELD

The embodiment discussed herein is directed to a communication terminal.

BACKGROUND

Conventionally, there is known a communication terminal referred to a mobile terminal. For example, a mobile personal computer, a mobile phone and the like are an example of the mobile terminal. Software (OS, application program) is installed in such mobile terminal to run to allow the mobile terminal to operate in various functions.

In addition, in the field of information process apparatus, a mode becomes common in which installed software is updated for use as appropriate. Also for software of the mobile terminal, demand grows to update software after a product shipment for a purpose such as a failure correction, a design change, a function addition and a revision of held information.

Various techniques which have been proposed in order to perform such software update will be described in the following.

(1) A technique in which, for a query from a terminal, a server gives a response of an importance degree of a software, a software update time, a model type, a version information and the like (see, for example, Japanese Laid-open Patent Publication No. 2006-340196).

(2) A technique in which a server determines a priority based on operation history information for each file transmitted from a terminal, and downloads a file with a high priority (see, for example, Japanese Laid-open Patent Publication No. 2000-222296).

(3) A technique in which a server which receives request data including generation information transmitted from a terminal returns response data including a priority (see, for example, Japanese Laid-open Patent Publication No. 2005-196269).

(4) A technique in which, before a task is started, competition is determined among plural tasks by querying a competition control section for a start go-no-go decision, and the start go-no-go decision of the task is determined (see, for example, Japanese Laid-open Patent Publication No. 2003-177926).

(5) A technique in which competitions among plural tasks are controlled in an application start by an event notification (see, for example, Japanese Laid-open Patent Publication No. 2005-284904).

(6) A technique in which, if a program is such large that communication time is excessive for downloading, a time period when an apparatus is available for use or a time period when a communication rate is low (see, for example, Japanese Laid-open Patent Publication No. 2003-078637).

(7) A technique in which, each terminal is caused to store data and time for an update of terminal software, a host computer determines based on the information when the host computer is logged in and automatically transfers new software if appropriate so as to make the terminal software to be automatically updated (see, for example, for example, Japanese Laid-open Patent Publication No. H03-244030).

Including the above-described techniques from (1) through (7), techniques for software update in a mobile terminal are classified into methods such as a method of updating manually by a user, a method of instantly updating by a server notification and a method of updating based on time designation by a server notification. Among these, the method of updating based on time designation by a server notification is more advantageous than other methods from the point of view of a load distribution of a server, because timing of software update performed in a number of mobile terminals are adjusted on a server side. However, in the following cases, it is impossible to perform a software update at a time designated by a server.

[Case 1] A case where a state of network is abnormal. At a time designated by a server, if a location where a terminal exists is a blind spot of a communication network to communicate with the server or if the communication network restricts communication, it is impossible to download an update file from the server because the network communication may not be carried out.

[Case 2] A case where a state of a terminal is abnormal. At a time designated by a server, if a battery remaining amount is small and a battery exhaustion occurs while an update file is downloaded from a server or while a software update is in process, it is impossible to complete normally the software update.

In addition, as software to be updated, there is software to be updated by servers of respective different parties such as OS family software and application family software. In such case, when update times in respective parties compete, it is required to make an update of OS family software a higher priority than an update of application family software. As a result, in the following cases, it is also impossible to automatically perform a software update at a time as designated by a server.

[Case 3] A case where an update start time comes for application family software while an update of OS family software is in process.

An earlier process to update OS family software is performed on a priority basis, and a latecomer process to update application family software is discarded.

[Case 4] A case where an update start time comes for OS family software while an update of application family software is in process.

A latecomer process to update OS family software is performed on a priority basis, and an earlier process to update application family software is discarded halfway and not completed normally.

In the above-described cases 1 through 4, because it is impossible to perform an automatic software update at a time designated by a server, a resume of a failed software update has to be left to a software update operation by a manual operation of a user. Thus, a software update is performed by a manual operation when the update is available. However, there are following problems.

[Problem 1] If a lot of software updates by manual operations are performed simultaneously at a same time, loads are concentrated to a server.

[Problem 2] Because there is a possibility that a user may forget a manual update, a reliable update may not be secured even for an important software update.

Of these problems, the problem 2 is specifically critical. In any of the above-described techniques from (1) through (7), once a software update is failed, a subsequent update may not be assured.

These problems may occur generally in a communication terminal not limited to a mobile terminal.

SUMMARY

According to an aspect of the present invention, a communication terminal includes:

an update section that obtains software via a communication network from a predetermined provider so as to update the software;

a failure monitor section that monitors whether there is a failure to interfere with an update of the software by the update section;

an update record section that records, if there is the failure and the update becomes an incomplete update on an occasion of the update by the update section, the presence of the incomplete update; and an update prompting section that prompts, if a monitor result by the failure monitor section changes from that there is a failure to that there is no failure, performing by the update section the update whose presence is recorded by the update record section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of registration in a state management DB;

FIGS. 4A-4C illustrate a process flow chart in a first condition;

FIGS. 5A-5C illustrate a process flow chart in a second condition;

FIGS. 6A-6C illustrate a process flow chart in a third condition; and

FIGS. 7A-7C illustrate a process flow chart in a fourth condition.

DESCRIPTION OF EMBODIMENTS

An exemplary embodiment will be explained with reference to the drawings.

Figure 1:
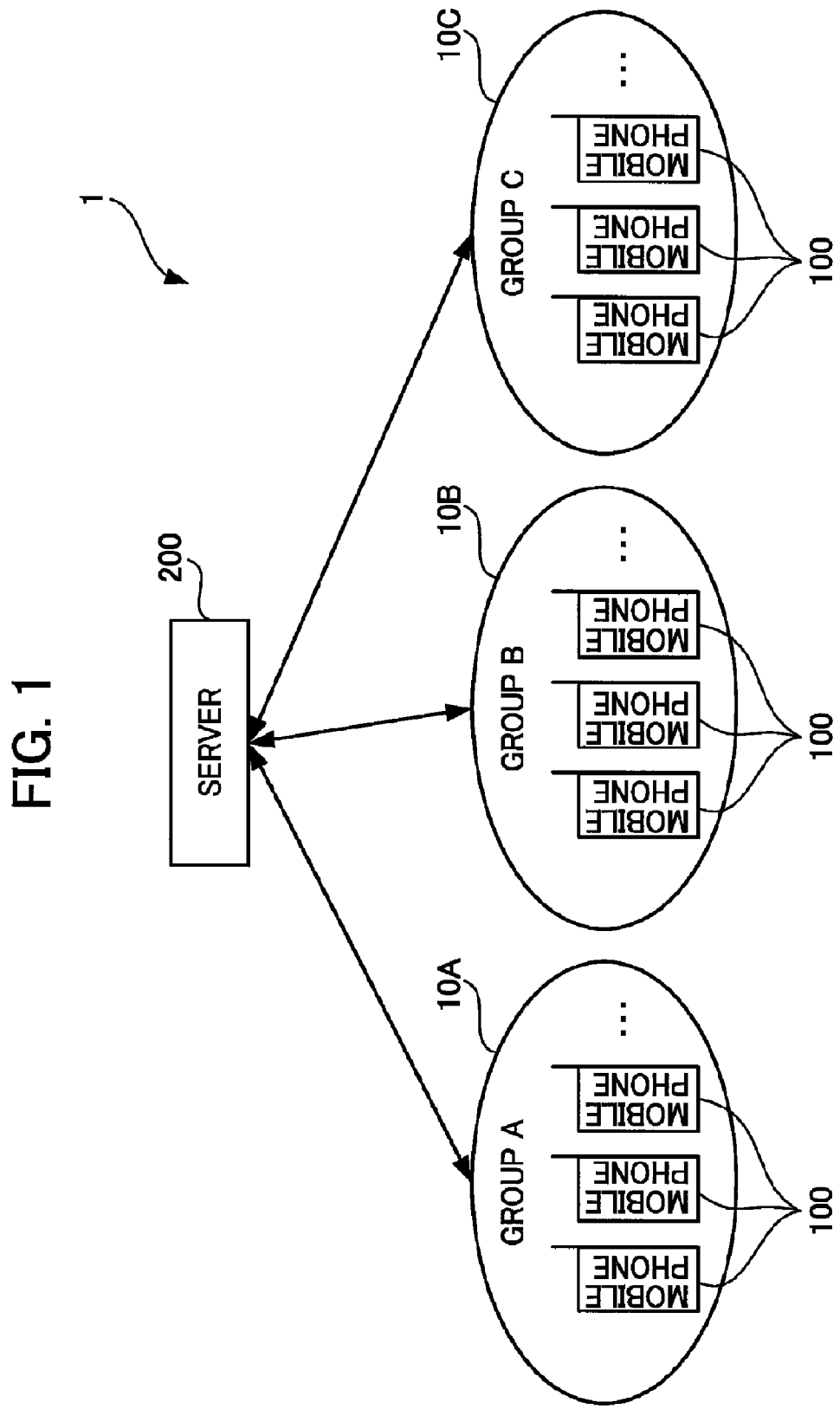
FIG. 1 is a diagram illustrating conceptually a software update system in which an embodiment of the present invention is incorporated.

FIG. 1 is a diagram illustrating conceptually a software update system in which an embodiment of the present invention is incorporated.

In FIG. 1, a mobile phone 100 is illustrated as an embodiment of the communication terminal according to the aspect of the present invention. In order to perform various processes internally, the mobile phone 100 requires updates of OS family software and application family software. In addition, the mobile phone 100 is incorporated in a software update system 1 to which an update method based on time designation by a server notification of the above-described methods of update is applied. In the software update system 1 illustrated in FIG. 1, a lot of mobile phones 100 that require a software update belong to one server 200 that provides an updated version of software and manages the software update. The server 200 illustrated in FIG. 1 is presented conceptually, and not distinguished as to whether a server which is responsible for OS family software or a server which is responsible for application family software. Actually, there exists a server of each party.

The server 200 classifies the mobile phones 100 into, for example, plural groups 10A, 10B, 10C such as "A", "B", "C", allocates individual update start times for the respective groups 10A, 10B, 10C and sends update notifications in which the respective update start times are written to the respective mobile phones 100 belonging to the respective groups 10A, 10B, 10C. Each mobile phone 100 starts a software update when the time notified from the server 200 comes. As a result, for example, mobile phones 100 which belong to the group 10A called "A" perform software updates respectively at a same time, which is different from a time when mobile phones 100 which belong to the group 10B called "B" perform software update. As a result, the load for the server 100 is distributed so that an efficient update is obtained.

Figure 2:
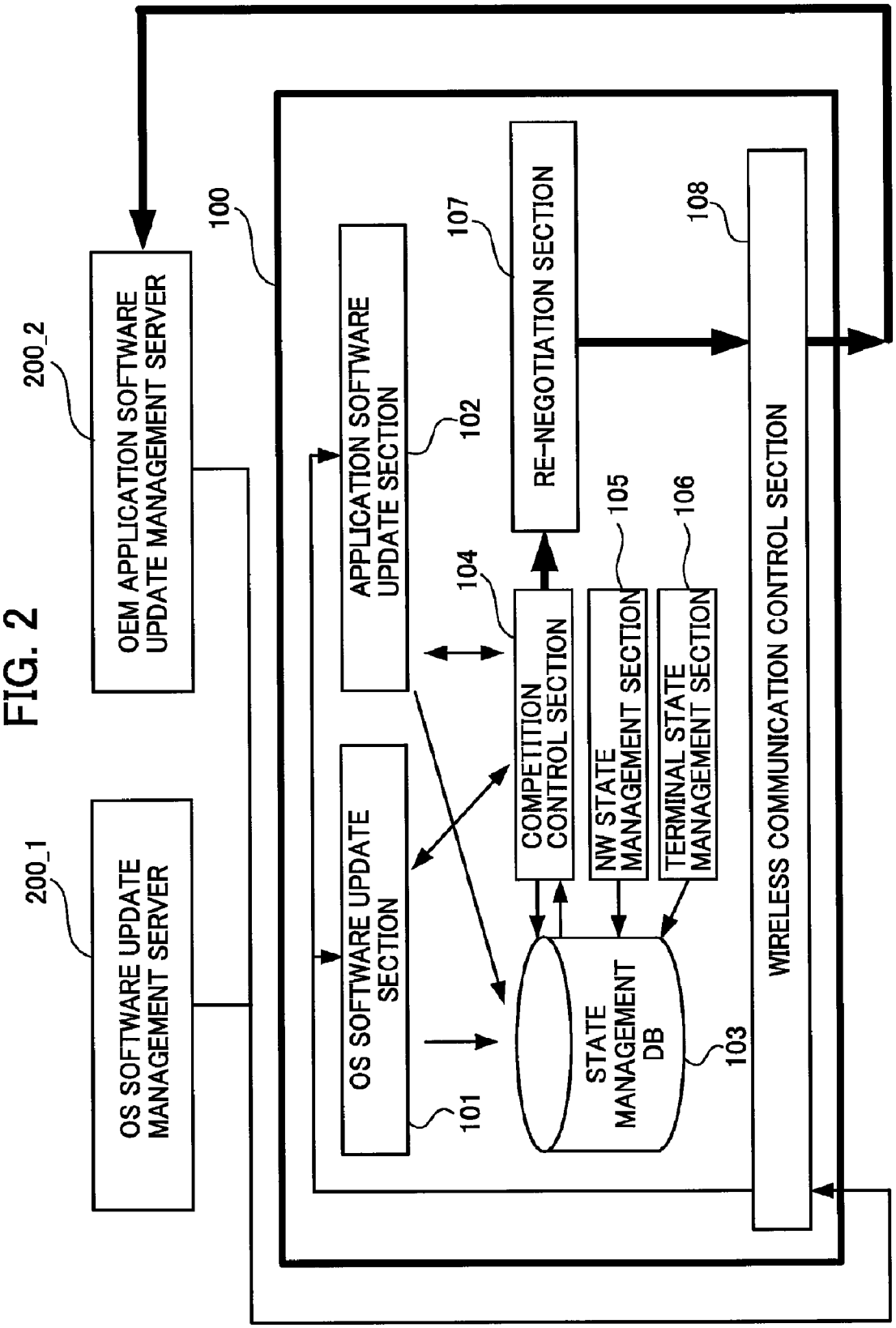
FIG. 2 is a functional block diagram illustrating internal functions of a mobile phone illustrated in FIG. 1.

FIG. 2 is a functional block diagram illustrating internal functions of a mobile phone illustrated in FIG. 1.

In FIG. 2, a functional block diagram of the mobile phone 100 is illustrated, and also two servers 200_1, 200_2 which provide an update version of software for the mobile phone 100 are illustrated. These servers 200_1, 200_2 are an example of the provider according to the aspect of the present invention and a specific example of the server 200 illustrated in FIG. 1, and are also servers which support a software update by the update method based on time designation by a server notification. One server (OS software update management server) 200_1 of these servers 200_1, 200_2 manages an update of OS software and the other server (OEM application software update management server) 200_2 manages an update of OEM application software which is already incorporated in the mobile phone 100 at the point of sale.

As an internal function of the mobile phone 100, there naturally exists a function as a phone and further there exist a function of electronic mail, a function as an internet terminal, a game function, a music replay function and the like. However, in the functional block diagram of FIG. 2, these functions are not specifically distinguished from one another, and illustrated as being carried collectively by OS software and OEM application software. In addition, regarding hardware to allow each function to work fully, hardware same as that provided in a conventional mobile phone is assumed to be provided. Regarding each function of the mobile phone 100 illustrated in FIG. 2, the functions including also a function which is newly introduced in the present invention may be performed on conventional hardware as it is, and so further explanation about the hardware will be omitted.

Here, an outline of each functional block of the mobile phone 100 will be explained. The mobile phone 100 includes an OS software update section 101, an application software update section 102, a state management DB (database) 103, a competition control section 104, a NW (network) state management section 105, a terminal state management section 106, a re-negotiation section 107 and a wireless communication control section 108.

The OS software update section 101 is a section which updates OS software of the mobile phone 100 and also is a section which executes the updated OS software to be allowed to work fully.

The application software update section 102 is a section which updates OEM application software of the mobile phone 100 and also is a section which executes the updated OEM application software to be allowed to work fully.

The OS software update section 101 and the application software update section 102 each corresponds to an example of the update section according to the aspect of the present invention. However, as described later, between the OS software update section 101 and the application software update section 102, there is a difference in competition of software update.

The state management DB 103 is database for managing various kinds of states inside and outside the mobile phone 100. The state management DB 103 corresponds to an example of the registration section in the failure monitor section according to the aspect of the present invention. A state to be managed by the state management DB 103 includes not only an internal state of the mobile phone 100 but also a state of communication environment in which this mobile phone 100 is placed and the like.

The competition control section 104 is a section which inquiries a current state of the state management DB 103, to determine competition as to software update. The competition control section 104 serves as an example of the failure determination section in the failure monitor section according to the aspect of the present invention, and also serves as an example of the update record section according to the aspect of the present invention. However, the "competition" referred to here has a broad meaning including such all factors as interfering software update, and, as a matter of course, includes a "competition" in a narrow meaning, i.e., an event in which another process impossible to be executed concurrently with an update process occurs, and further includes, for example, an event in which a communication state falls into a failure and it is impossible to perform a download for a software update, an event in which the hardware in the mobile phone 100 is in a state failure so that it is impossible to perform a software update, and the like.

The NW state management section 105 is a section which monitors a communication state in a communication network to which the mobile phone 100 is connected, via the wireless communication control section 108.

The terminal state management section 106 is a section which monitors a state inside the mobile phone 100.

Each of the NW state management section 105 and the terminal state management section 106 corresponds to an example of the state monitor section in the failure monitor section according to the aspect of the present invention.

The re-negotiation section 107 is a section which requires a re-issue of software update notification to the servers 200_1, 200_2. The re-negotiation section 107 corresponds to an example of the update prompting section.

The wireless communication control section 108 is a section which controls wireless communication by the mobile phone 100.

Next, these functional blocks and a flow of information and the like in the mobile phone 100 will be explained.

First, as described above, the OS software update management server 200_1 and the OEM application software update management server 200_2 allocate start times of software update for the mobile phone 100, and transmits update notifications including update start time data representing the respective start times. On the mobile phone 100 side, each of the OS software update section 101 and the application software update section 102 receives, via the wireless communication control section 108, the update notifications from a corresponding server and causes the state management DB 103 to register times represented by the update start time data included in the update notifications.

In addition, each of the NW state management section 105 and the terminal state management section 106 constantly monitors a communication state of the communication network and a state inside the mobile phone 100. In a case in which the NW state management section 105 detects a state in which it is impossible to communicate with the communication network, for example, such as a case in which the mobile phone 100 exists at a blind spot of the communication network and a case in which communication is restricted from the communication network, the NW state management section 105 causes the state management DB 103 to register the state. In a case in which the terminal state management section 106 detects a state of interfering a download inside the mobile phone 100, for example, such as a case in which a battery remaining amount of the mobile phone 100 is running short and a case in which a remaining amount of memory prepared for various kinds of processes in the mobile phone 100 is in shortage, the terminal state management section 106 registers such state in the state management DB 103.

Here, an example of the registration in the state management DB 103 will be explained.

FIG. 3 is a diagram illustrating an example of registration in the state management DB.

In FIG. 3, a management table 300 prepared in the state management DB is illustrated. In the management table 300, an update time section 310 in which the update start time is registered and a state section 320 in which various kinds of states are registered are provided.

According to the example illustrated in FIG. 3, in the update time section 310, a start time 311 allocated from the OEM application software update management server 200_2 and a start time 312 allocated from the OS software update management server 200_1 are registered. These start times 311, 312 are expressed in "year"/"month"/"day" "o'clock": "minute" format. In addition, according to the example illustrated in FIG. 3, current states 321, 322, 323, 324, respectively as to four state kinds of "IN UPDATING OS" "BLIND SPOT" "RESTRICTED" "BATTERY REMAINING AMOUNT" are registered in two choices of "Yes" and "No" or in two choices of "OK" and "NG" in the state section 320. Incidentally, the example of the state illustrated in the state section 320 of FIG. 3 depicts concisely what is needed for the following explanation, and actually other kinds of states are further registered.

Returning to FIGS. 4A-4C, the explanation will be continued.

After the start times allocated from the servers 200_1, 200_2 are registered in the state management DB 103, when the start time comes, the OS software update section 101 and the application software update section 102 inquire permissibility-impermissibility of a software update execution to the competition control section 104. The competition control section 104 which receives the inquiry asks the state management DB 103 of various kinds of registered states and update start times to confirm them. Then, the competition control section 104 determines, based on the various kinds of states and the update start time, whether or not it is in a state suitable for executing a software update and responds a determination result to the OS software update section 101 and the application software update section 102.

If the determination result by the competition control section 104 indicates permissibility of execution, the OS software update section 101 and the application software update section 102 download an update version of software via the wireless communication control section 108 from the OS software update management server 200_1 or the OEM application software update management server 200_2 so as to update the software. The OS software update management server 200_1 or the OEM application software update management server 200_2 which have updated the software request the state management DB 103 to remove the update start times and the state management DB 103 removes the update start times.

On the other hand, when the determination result by the competition control section 104 indicates impermissibility of execution, the OS software update section 101 and the application software update section 102 postpone the software update, and request the state management DB 103 to remove the update start times and also issue a re-negotiation reservation to the competition control section 104. This re-negotiation reservation is a flag representing that there exists an incomplete software update and is recorded in a memory (not illustrated in the drawing) by the competition control section 104.

Subsequently, when a change occurs in the registered states and the like, the state management DB 103 notifies, the competition control section 104 of the state change. When the competition control section 104 is notified of the state change in a case where the flag of the re-negotiation is set, the competition control section 104 again determines permissibility-impermissibility of the software update based on a state after the change. Then, if the competition control section 104 confirms resolution of competition ant determine permissibility of execution, a re-negotiation request of software update is issued from the competition control section 104 to the re-negotiation section 107. The re-negotiation section 107 which has received this re-negotiation request of software update requests a re-issue of the above-described update notification via the wireless communication control section 108 to the servers 200_1, 200_2 associated with the software to be updated.

The servers 200_1, 200_2 which are requested of the re-issue of the update notification performs again allocation of the start time for the mobile phone 100, and transmits a new update notification including update start time data representing a new start time. As a result, the above-described procedures are repeated so that the software update is performed. Since this software update is different from the first software update and is an software update after it is confirmed that a competition in the competition control section 104 is resolved, this update may be expected to be securely performed.

In the following, assuming various specific conditions, it will be confirmed that the software update by the mobile phone 100 according to the present embodiment may be securely performed under any conditions.

[First Condition]

Firstly, as a first condition, a condition is assumed that a state abnormality of a communication network mediating the mobile phone 100 and the OEM application software update management server 200 interferes with the software update.

FIGS. 4A-4C illustrate a process flow chart in a first condition.

First, in step S101, a start time of software update is allocated by the OEM application software update management server 200_2 as described above. A notification of update including the start time is sent via the wireless communication control section 108 to the application software update section 102. Then, the application software update section 102 confirms the allocated start time and informs the state management DB 103 of it. In the state management DB 103, the start time is registered in the update time section 310 illustrated in FIG. 3. If a state of a communication network is normal at this time point and in a subsequent step S102, a state abnormality (here, for example, "BLIND SPOT") of the communication network is detected by the NW state management section 105, the NW state management section 105 requests the state management DB 103 to store "Yes" as the "BLIND SPOT" state illustrated in FIG. 3. The state management DB 103 stores "Yes" in the "BLIND SPOT" state.

Next, when the start time of software update comes, in step S103, the application software update section 102 inquires permissibility-impermissibility as to update process execution of the competition control section 104. The competition control section 104 requires each data which is registered at the time point in the management table 300 in FIG. 3 of the state management DB 103. The state management DB 103 returns the each date registered. Then, the competition control section 104 determines permissibility-impermissibility of update process execution based on whether or not a state in the returned data is [IN UPDATING OS:BLIND SPOT:RESTRICTED:BATTERY REMAINING AMOUNT]=[No:No:No:OK], and returns a determination result to the application software update section 102. Here, based on that the "BLIND SPOT" is "Yes", it is determined to be impermissible. Incidentally, how to use the update start time in the data returned from the state management DB 103 will be explained later.

The application software update section 102 which receives the return of the determination result as to permissibility-impermissibility of execution, in step S104, if the determination result is "OK", downloads an update file from the OEM application software update management server 200_2 and executes the update process. In addition, if the determination result is "NG", a flag of re-negotiation reservation representing that a software update to be performed remains is sent from the application software update section 102 to the competition control section 104 to be stored in a memory.

Subsequently, in step S105, if it is detected that the "BLIND SPOT" state is resolved and the state becomes the "WITHIN RANGE", the NW state management section 105 requests the state management DB 103 to store "NO" as the "BLIND SPOT" state 322 illustrated in FIG. 3. The state management DB 103 stores "NO" in the "BLIND SPOT" state. Then, in step S106, the state management DB 103 detects a change of the registered state and sends a Notification to the competition control section 104. This Notification is to give a notice that a change occurs in the state registered in the state management DB 103.

The competition control section 104 which receives the Notification confirms, in step S107, whether or not there is a re-negotiation reservation. If there exists the re-negotiation reservation, the competition control section 104 requires each data which is registered at the time point in the management table 300 in FIG. 3 of the state management DB 103. The state management DB 103 returns the each registered data. The competition control section 104 confirms the state in the returned each data and as described above, determines permissibility-impermissibility of update process execution. Then, if the determination result is "OK", the competition control section 104 instructs the re-negotiation section 107 to start a re-negotiation, The re-negotiation section 107 generates a software update re-notification request. This software update re-notification request is a request to use a function prepared for software initial setting and the like of functions conventionally provided in the OEM application software update management server 200_2, and is for requesting an allocation and a notification of an update start time of the OEM application software update management server 200_2. The software update re-notification request generated in the re-negotiation section 107 is sent via the wireless communication control section 108 to the OEM application software update management server 200_2. Incidentally, in this step S107, if there does not exist the re-negotiation reservation, or if the determination result as to permissibility-impermissibility of update process execution is "NG", a state of waiting for the Notification from the state management DB 103 is brought about.

When the OEM application software update management server 200_2 receives the software update notification request, the above-described processes from step S101 are repeated. This time, there is a high possibility that a detection of the BLIND SPOT in step S102 and does not occur when the allocated update time comes, the processes of step S103, step S104 are performed, a download of an update file and the update process are preformed normally and thus it is expected that the software update is completed.

[Second Condition]

Next, as a second condition, a condition is assumed that an internal state of the mobile phone 100 becomes failed to interfere with the software update.

Figure 5A:
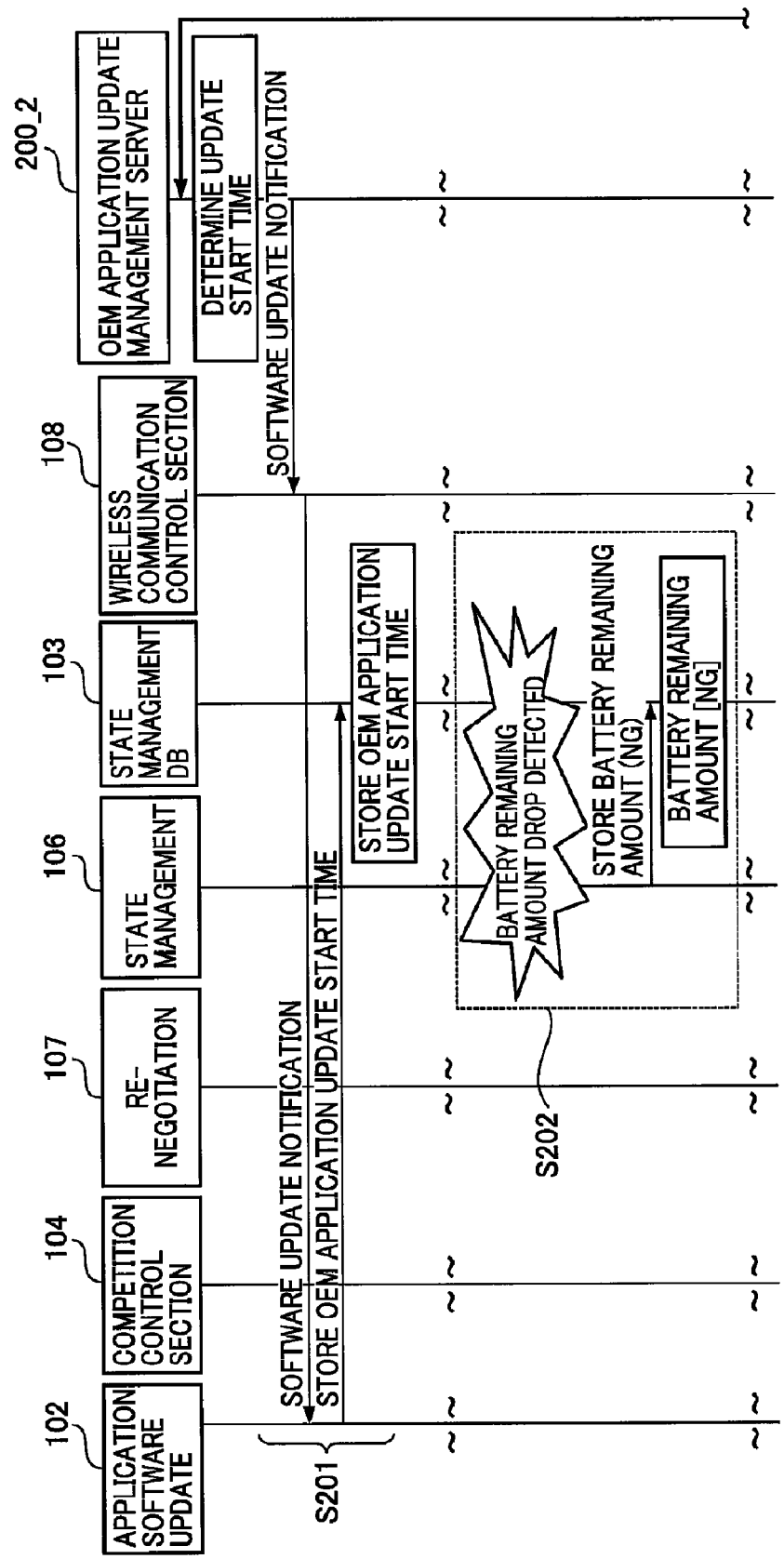
Figure 5C:
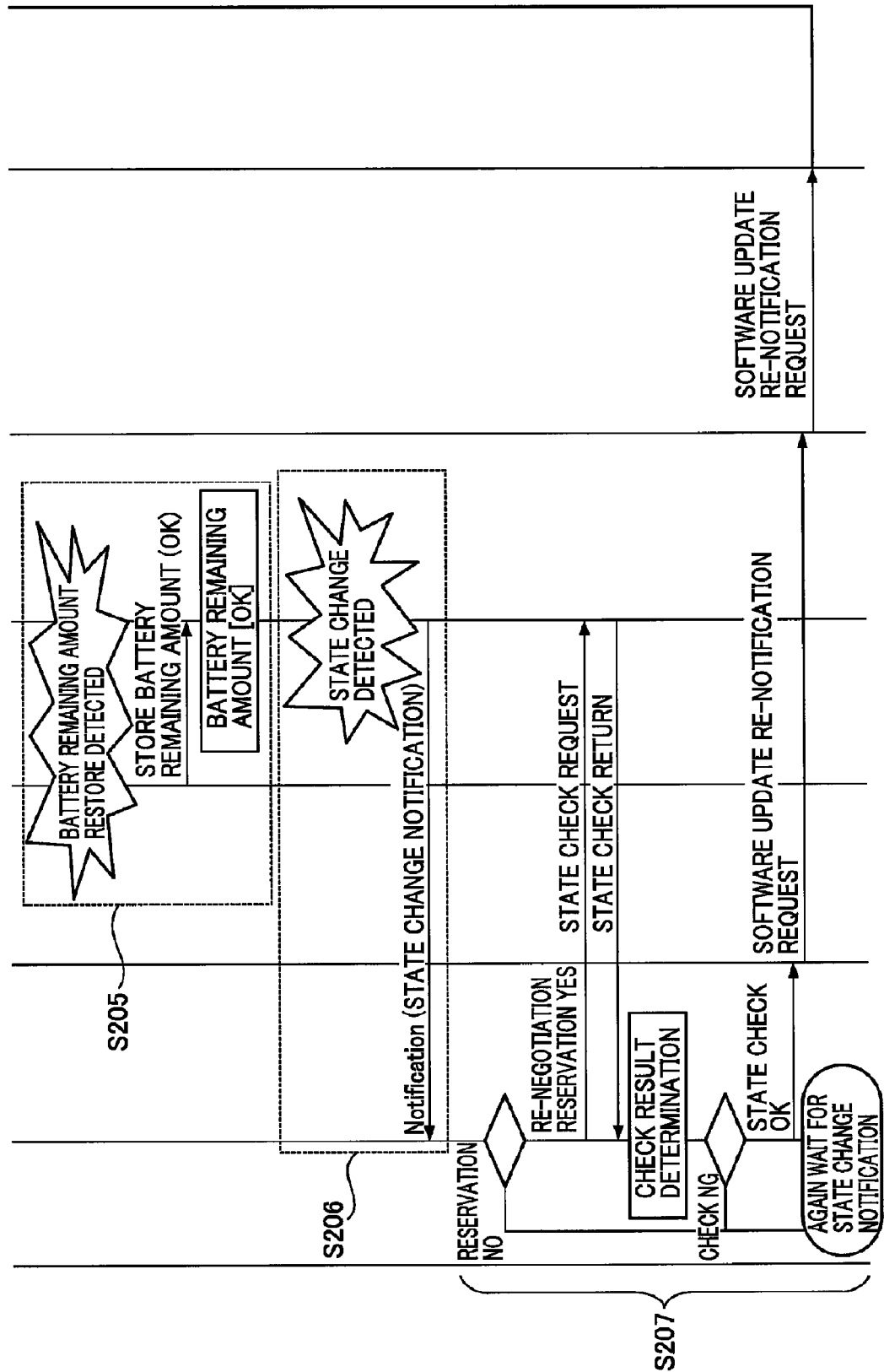

FIGS. 5A-5C illustrate a process flow chart in the second condition.

Firstly, in step S201, same as step S101 in FIGS. 4A-4C, an allocation and a notification of an update start time by the OEM application software update management server 200_2, a confirmation of the start time by the application software update section 102 and registration of the start time by the state management DB 103 are performed. If the internal state of the mobile phone 100 is normal at this time point, and however, in the following step S202, an abnormality (here, for example, "BATTERY REMAINING AMOUNT" drop) of the internal state of the mobile phone 100 is detected by the terminal state management section 106, the terminal state management section 106 requires the state management DB 103 to store "NG" as the "BATTERY REMAINING AMOUNT" state 324 illustrated in FIG. 3 and the state management DB 103 stores "NG" in the "BATTERY REMAINING AMOUNT" state.

Next, when the start time of software update comes, in step S203, same as step S103 in FIGS. 4A-4C, a determination of permissibility-impermissibility and a return are performed by the competition control section 104. In step S204, same as step S104 in FIGS. 4A-4C, an update execution and an issue of re-negotiation reservation are performed by the application software update section 102. However, in this second condition, based on that the "BATTERY REMAINING AMOUNT" state is "NG", a determination of impermissibility and the issue of a re-negotiation reservation are performed.

Subsequently, in step S205, if the terminal state management section 106 detects a recovery of "battery remaining amount", the terminal state management section 106 requires the state management DB 103 to store "OK" as the "BATTERY REMAINING AMOUNT" state 324 illustrated in FIG. 3. The state management DB 103 stores "OK" in the "BATTERY REMAINING AMOUNT" state. Then, in step S206, the state management DB 103 detects a change of the registered state and sends a Notification to the competition control section 104.

In step S207, same as step S107 in FIGS. 4A-4C, a confirmation as to whether or not there is the re-negotiation reservation by the competition control section 104, a determination of permissibility-impermissibility as to update execution by the competition control section 104 and generating and sending of the software update re-notification request by the re-negotiation section 107 are performed. When the OEM application software update management server 200_2 receives the software update re-notification request, the above-described processes from step S201 are repeated.

This time, there is a high possibility that a detection of the battery remaining amount drop in step S202 does not occur. When the allocated update time comes, the processes of step S203 and step S204 are performed, a download of the update file and an update execution are normally performed and so it is expected that the software update is completed.

Incidentally, in the above explanation of step S202, even though a method of determining battery remaining amount shortage is not specifically explained, a conventional method represented by a method of determination by setting a threshold in a battery remaining amount percent or the like may be arbitrarily employed. In addition, regarding the method of determination of the battery remaining amount recovery in step S205, a conventional method represented by a determination method in which a threshold is similarly set, a determination method in which a 100% charge serves as a trigger or the like may be arbitrarily employed.

[Third Condition]

Next, as a third condition, a condition is assumed that while OS family software is in an update process, an update start time of OS application family software comes.

Figure 6A:
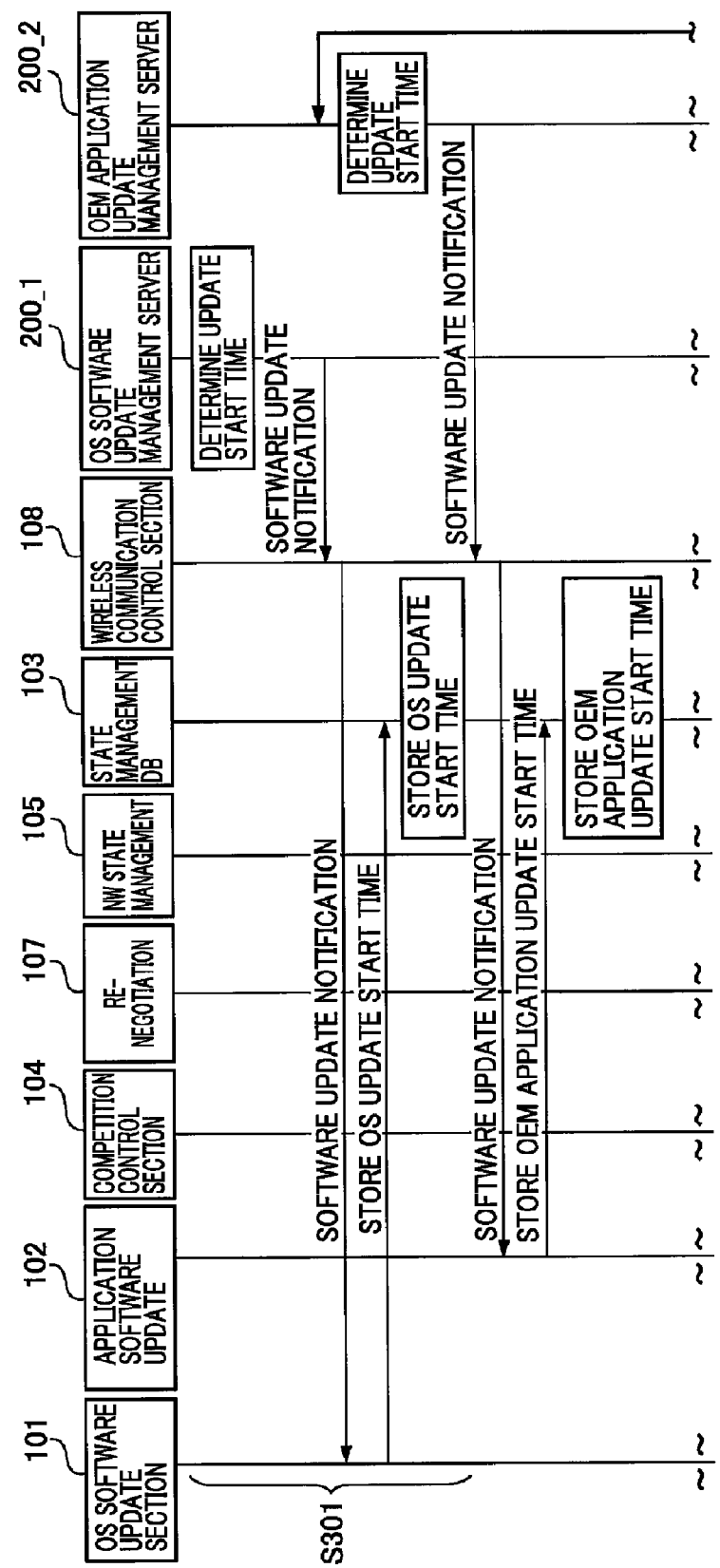
Figure 6C:
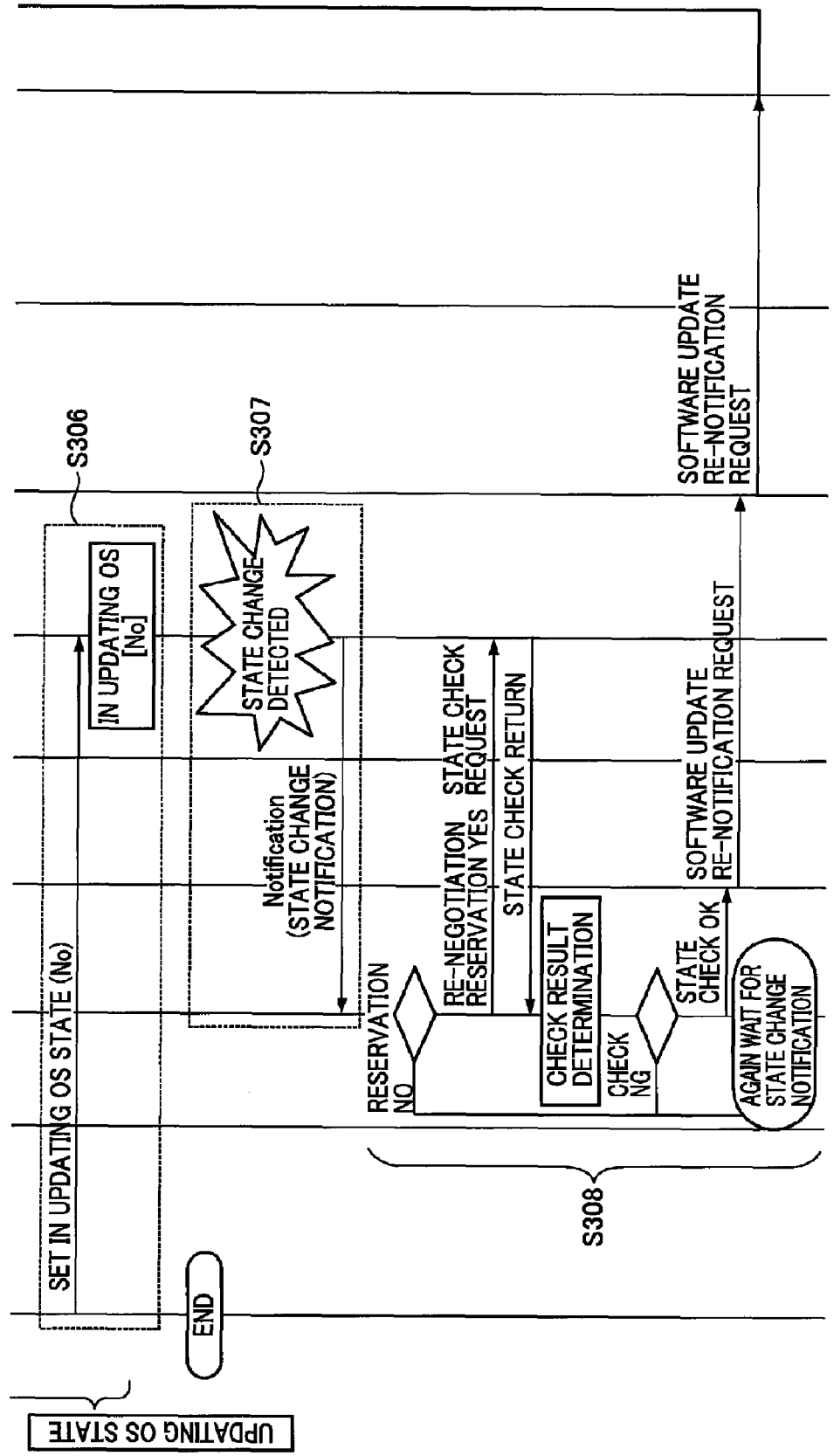

FIGS. 6A-6C illustrate a process flow chart in a third condition.

First, in step S301, start times of software update are allocated for the mobile phone 100 by the OS software update management server 200_1 and the OEM application software update management server 200_2, respectively. Update notifications including the start times are sent via the wireless communication control section 108 to the OS software update section 101 and the application software update section 102, respectively. Then, the OS software update section 101 and the application software update section 102 confirm the allocated start times and inform the state management DB 103 of them. In the state management DB 103, these start times are registered in the update time section 310 illustrated in FIG. 3.

Subsequently, when the start time of update for the OS family software comes, in step S302, the OS software update section 101 requires the state management DB 103 to store "Yes" as the "IN UPDATING OS" state 321. The state management DB 103 stores "Yes" in the "IN UPDATING OS" state. Then, in step S303, the OS software update section 101 downloads an update file from the OS software update management server 200_1 and executes an update process. Incidentally, a determination of permissibility-impermissibility by the competition control section 104 is essentially performed prior to the update process, however it is omitted here for avoiding a complication of the explanation.

Next, when the update start time of the OEM application family software comes, in step S304, same as step S103 in FIGS. 4A-4C, a determination of permissibility-impermissibility and a return by the competition control section 104 are performed, and in step S305, same as step S104 in FIGS. 4A-4C, an update execution and an issue of a re-negotiation reservation by the application update section 102 are preformed. However, in this third condition, based on that the "IN UPDATING OS" state is "Yes", the determination of impermissibility and the issue of re-negotiation reservation are performed.

Subsequently, when the update process in the OS software update section 101 is completed, in step S306, the OS software update section 101 requires the state management DB 103 to store "No" as the "IN UPDATING OS" state. The state management DB 103 stores "No" in the "IN UPDATING OS" state. Then, in step S307, the state management DB 103 detects a change of the registered state and sends the Notification to the competition control section 104.

In step S308, same as step S107 in FIGS. 4A-4C, a confirmation as to whether or not there is a re-negotiation reservation by the competition control section 104, a determination as to permissibility-impermissibility of update execution by the competition control section 104, generating and sending of a software update re-notification request by the re-negotiation section 107 are performed. When the OEM application software update management server 200_2 receives the software update re-notification request, the process relating to the OEM application family software of the above-described processes from step S301 are repeated. As a result, this time, an update process of the OS family software is not executed. When the allocated updated time of the OEM application family software comes and then the processes of step S304 and step S305 are performed, a download of an update file and an update process are normally performed so that the update of the OEM application family software is completed.

[Fourth Condition]

Next, as a fourth condition, a condition is assumed that while OEM application family software is in an update process, an update start time of OS family software comes.

FIGS. 7A-7C illustrate a process flow chart in a fourth condition.

Firstly, in step S401, same as step S301 in FIGS. 6A-6C, allocations and notifications of update start times by the servers 200_1, 200_2, confirmations of the start times by the OS software update section 101 and the application software update section 102 and a registration of the start time by the state management DB 103 are performed.

Subsequently, when the update time of the OEM application family software comes, in step S402, same as step S103 in FIGS. 4A-4C, a determination of permissibility-impermissibility of execution and a return by the competition control section 104 are performed. In this fourth condition, a determination using the update start time whose explanation is omitted in the above description is performed and will be explained in the following. The competition control section 104 confirms the start times 311, 312 registered in the update time section 310 in FIG. 3 of each of data returned from the state management DB 103. Then if a difference between those start times 311, 312 is within a predetermined threshold, because there is a high possibility that an update time of OS family software comes while the OEM family software is in an update process, a determination of permissibility-impermissibility as to the update process of the OEM application family software is performed and the determination result is returned to the application software update section 102.

The application software update section 102 which receives the return of the determination result by the competition control section 104 performs, same as step S104 in FIGS. 4A-4C, an update execution and an issue of a re-negotiation reservation. However, here, as a difference between the update start times is within a predetermined threshold, an issue of a re-negotiation reservation is performed.

Subsequently, when the update start time of the OS family software comes, in step S404, same as step S302, step S303 and step S306 in FIGS. 6A-6C, storing "Yes" as the "IN UPDATING OS" state, downloading an update file of the OS family software, updating and storing "No" as the "IN UPDATING OS" state are sequentially performed. Incidentally, in the state management DB 103, removing the update start time of the OS family software as well as the storing "No" as the "IN UPDATING OS" state are performed. Then, in step S405, the state management DB 103 detects a change of the registered state and sends a Notification to the competition control section 104.

In step S406, same as step S107 in FIGS. 4A-4C, a confirmation as to whether or not there is a re-negotiation reservation by the competition control section 104, a determination of permissibility-impermissibility as to update execution by the competition control section 104, and generating and sending a software update re-notification request by the re-negotiation section 107 are performed. When the OEM application software update management server 200_2 receives the software update re-notification request, the processes relating to the OEM application family software of the above-described processes from step S401 are repeated. This time, because the update start time of the OS family software is removed from the state management DB 103, when the update time of the OEM application family software comes and the processes of step S402, step S403 are performed, a download of an update file and an update process are normally performed so that the update of the OEM application family software is completed.

As explained above, according to the mobile phone 100 of the present embodiment, the software update is reliable in any of the assumed conditions. In addition, because an unnecessary process due to attempting a useless update and an occurrence of unnecessary communication are avoided, a favorable efficiency is obtained.

Incidentally, in the above-described embodiment, as a preferable mode, the example is explained that the Notification is issued from the state management DB 103. However, according to the aspect of the invention, a mode is possible that the competition control section 104 periodically confirms registered data in the state management DB 103.

In addition, in the above-described embodiment, as a preferable mode, the example is explained that a re-allocation of update time is performed in the OEM application software update management server 200_2 according to the software update re-notification request by the re-negotiation section 107. However, according to the aspect of the present invention, in a case where a resolve of competition is confirmed by the competition control section 104, a mode is possible that a download of an update file and an update process are immediately performed by the application software update section 102.

According to the aspect of the present invention, even in a case where a software update is failed due to a failure, because the update is prompted when the failure disappears, a secure update of software may be expected. In addition, according to the aspect of the present invention, because not only an update process is simply repeated but also a failure is monitored so as to prompt the update when the failure disappears, it is possible to prevent an occurrence of an useless process or unnecessary communication and a reliable and efficient update may be obtained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A communication terminal, comprising:

a processor and memory, the memory configured to store program instructions and data the processor configured to execute the program instruction and process the data to implement:

a communication section that communicates with a communication network;

a record section that stores data;

an update section that obtains software via the communication section from the communication network from a predetermined provider so as to update the software;

a failure monitor section that monitors whether there is a failure to interfere with an update of the software by the update section;

an update record section that records, if there is the failure and the update becomes an incomplete update on an occasion of the update by the update section, the presence of the incomplete update in the record section; and an update prompting section that prompts, if a monitor result by the failure monitor section changes from that there is a failure to that there is no failure, performing by the update section the update whose presence is recorded by the update record section;

wherein the failure monitor section includes:

a state monitor section that monitors a state of at least one of an inside and an outside of the communication terminal;

a registration section in which a monitor result by the state monitoring section is registered and which gives a notification if the registered monitor result is changed; and a failure determination section that determines whether or not there is the failure based on the monitor result which is registered in the registration section, and determines, if the notification is given, whether or not there is a failure for the update whose presence is recorded by the update record section.

2. The communication terminal according to claim 1, wherein the provider allocates an update time for the update section, the update section starts the update when the update time allocated from the provider comes, and the update prompting section requires the provider to re-allocate the update time.

3. The communication terminal according to claim 1, wherein the failure monitor section monitors, as the failure, a communication failure between the update section and the provider.

4. The communication terminal according to claim 1, wherein the failure monitor section monitors, as the failure, an internal physical state of the communication terminal, the internal physical state interfering with an update process.

5. The communication terminal according to claim 1, wherein the failure monitor section monitors, as the failure, the presence of a process which is higher in priority than the update by the update section.

* * * * *